United States Patent Office 3,079,337
Patented Feb. 26, 1963

3,079,337
REACTION PRODUCTS OF ETHYLENE OXIDE AND POLYHYDROXIDE ALCOHOLS AS WATER VISCOSITY THICKENERS FOR SECONDARY RECOVERY
Albin F. Turbak, New Providence, and George T. Davis, New Brunswick, N.J., assignors to Jersey Production Research Company, a corporation of Delaware
No Drawing. Filed Mar. 28, 1960, Ser. No. 17,774
4 Claims. (Cl. 252—8.55)

The present invention is broadly concerned with a secondary recovery process for the more effective and efficient recovery of oil from subterranean reservoirs. The invention is particularly directed to a secondary recovery operation wherein a fluid such as water is employed as a driving medium. The invention is especially concerned with an improved type of viscous waterflooding process in which fingering and oil reservoir bypassing on the part of the driving fluid are substantially reduced by the utilization of a particular class of water thickening agents wherein copolymers of ethylene oxide and polyhdroxy compounds are used to reduce viscosity loss during the viscous flooding operation. Particular copolymers are those produced by reacting ethylene oxide with non-linear branched polyhdroxy compounds, such as pentaerythritol. Other particularly desirable compounds are those produced by reacting ethylene oxide to produce adducts of polyvinyl alcohol.

In the recovery of oil from subterranean reservoirs, there have been substantial advances in primary recovery techniques so as to substantially increase the recovery of oil. However, an appreciable quantity of the oil remains in the reservoir after termination of the primary recovery methods. In general, it is estimated that only about 10 to 30% of the oil can be economically recovered by primary recovery techniques. A greater amount may be recovered by other secondary techniques, such as repressuring treatments following the primary method.

Thus, there exists a great interest in secondary recovery methods. Secondary recovery is the recovery of additional quantities of oil from a reservoir after it is no longer economical to recover oil by primary recovery methods. For example, a secondary operation may be conducted by drilling one or more injection wells into a permeable oil bearing formation within suitable proximity to a producing well or wells which are drilled into this same permeable oil bearing formation. Injection of liquids or gases through the injection well is generally effective in increasing the oil production from the producing well or wells. This technique of secondary recovery enables the recovery of substantially more oil than can be produced by primary recovery methods.

As pointed out, the use of a number of secondary recovery procedures for removing oil from subterranean oil reservoirs are well known in the petroleum industry. It is the function of such procedures to make possible the recovery of oil from reservoirs after primary production methods are uneconomical. In general, all secondary recovery procedures employ a driving medium such as a liquid or gas for displacing additional oil from a reservoir. The displacing medium, usually a fluid, is injected in a reservoir as by means of one or more of the original wells or by means of entirely new wells; and the oil in the reservoir is displaced toward and withdrawn from other remaining wells.

Due partially to its ready availability in many regions, water has been extensively employed as a driving medium in secondary oil recovery programs.

While conventional waterflooding is effective in obtaining additional oil from subterranean oil reservoirs, it has a number of shortcomings which detract seriously from its value. Foremost among these shortcomings is a tendency of flood water to "finger" through a reservoir and to bypass substantial portions of the reservoir. In other words, a water drive has a less than perfect "sweep efficiency" in that it does not contact all portions of the reservoir. Furthermore, it does not normally displace as much oil in the portions of the reservoir which it contacts as it theoretically is capable of doing.

The fingering tendency of a waterflood is usually explained by the fact that oil reservoirs possess regions and strata that have different permeabilities. The water flows more rapidly through those regions and strata having a greater relative permeability to water than in other portions of the reservoir. Waterflooding often completely misses substantial portions of the reservoir. The net result is an inefficient oil displacement action on the part of the water.

At this point, it should be noted that crude oils vary greatly in viscosity—some being as low as 1 or 2 cps. and some ranging up to 100° cps. or even more. It has been established that waterflooding performs less satisfactorily with viscous crude oils than with relatively non-viscous oils. In other words, the fingering and bypassing tendencies of the water drive are more or less directly related to the ratio of the viscosity of the reservoir oil to the viscosity of the aqueous driving medium.

Also of interest at this point is a mathematical relationship that has been developed in recent years to help explain the behavior of fluids flowing through porous media such as oil reservoirs. When this equation is applied to a flooding operation or the like within an oil reservoir, it reads as follows:

$$\frac{M_o}{M_e} = \frac{\mu e}{\mu o}, \frac{K_o}{K_e}$$

where $M_o$ is the mobility of the oil to the reservoir in question
$M_e$ is the mobility of the flooding medium to the reservoir in question
$\mu o$ is the viscosity of the driven oil
$\mu e$ is the viscosity of the flooding medium
$K_e$ is the relative permeability of the reservoir toward the flooding medium in the presence of residual oil
$K_o$ is the relative permeability of the reservoir toward the oil in the presence of connate water.

This equation is perhaps best explained by stating that when the mobility ratio of oil to the driving fluid within the reservoir is equal to one, the oil and driving fluid move through the reservoir with equal ease. Substantially equilibrium proportions of driving fluid and oil remain within the reservoir as soon as the driving fluid has passed therethrough. Expressed otherwise, the mobility ratio term affords a measure of the volume of driving fluid and the amount of time that is required to reduce the oil content of the reservoir to an ultimate equilibrium value. For example, a given volume of driving fluid operated at a mobility ratio of one or greater will displace a markedly greater volume of oil from a reservoir than will an equal volume of driving fluid operating at a mobility ratio of less than one.

Several procedures have been suggested to date for improving the mechanics of waterflooding procedures particularly with the view to reducing the degree of fingering and bypassing. One suggestion has been to increase the viscosity of the water drive relative to the oil by incorporating water soluble viscous agents within the water. Materials that have been suggested for this purpose include a wide variety of naturally occurring gums, sugars and polymers. While these materials are effective to an extent in increasing the viscosity of flood water, they are also characterized by serious disadvantages. For example, some of the materials have a tendency to plug formations; some are relatively unstable; and some have relatively little thickening effect. Additionally, many of these materials are quite expensive and their use is not feasible from the standpoint of economics.

Accordingly, it is an object of this invention to provide an improved type of displacement process in which a marked increase in the viscosity of the driving fluid may be readily attained using synthetic polymers. It is also an object of the invention to provide a viscous "waterflooding" process in which the increased viscosity of the flood water is attained inexpensively and synthetically. It is still a further object of the invention to use a driving fluid which does not plug the reservoir.

In accordance with a specific adaptation of the present invention, an improved class of water thickening agents is utilized in the presence of added formaldehyde in order to reduce viscosity loss during the viscous waterflooding operation.

As pointed out heretofore, the present compounds are polymers of ethylene oxide and polyhydroxy compounds. These compounds may comprise non-linear branched polyhydroxy materials such as pentaerythritol, trimethylolpropane, glycerol and basic sugar molecules, such as glucose, mannose and fructose. The polyhydric alcohols are preferred. In general, the molecular weight should be in excess of 100,000 preferably above 500,000 and may be as high as 3,000,000.

Other satisfactory compounds are ethylene oxide adducts of polyvinyl alcohols. The polyvinyl alcohol may be produced by either an emulsion technique, a suspension technique or direct bulk polymerization of vinyl acetate followed by hydrolysis of the acetate function. Satisfactory procedures for producing polyvinyl alcohols are disclosed in U.S. Patents Nos. 2,485,141; 2,109,883; 2,227,997 and 2,266,966. A commercial grade of polyvinyl alcohol having 98% of the acetate groups hydrolyzed is suitable for use in the present invention.

The ethylene oxide aduct may be produced by various procedures known in the art. Whether the reaction is conducted in aqueous or non-aqueous solvent or neat is not critical, but non-aqueous or neat preparations are preferable since they tend to produce less ethylene oxide homopolymers. One satisfactory method of preparing the adduct is disclosed in U. S. Patent No. 1,971,662 wherein polyvinyl alcohol is run directly with the ethylene oxide in the presence of a tertiary amine, such as dimethyl aniline. A suitable mixture comprises 100 grams of polyvinyl alcohol, 100 grams of ethylene oxide and 5 to 10 grams of dimethyl aniline. The mixture is heated for about two hours at a temperature in the range from about 50° to 70° C. to secure about 160 grams of product. Another method is disclosed in U.S. Patent No. 2,796,413 wherein dimethyl formamide is utilized as a solvent.

The addition of ethylene oxide to polyvinyl alcohol produces a polymer which has a better thickening efficiency. Thus, a polyvinyl alcohol (98% hydrolyzed) at 1% concentration had a viscosity of 3.39 centistokes at 25° C. 1% of ethoxylated polyvinyl alcohol had a viscosity of 6.7 centistokes at 25° C. The tendency of polyvinyl alcohol to form gels and to further gel and precipitate is a marked phenomenon. The introduction of ethylene oxide residues into polyvinyl alcohol eliminates this gelation tendency and thus is valuable for preventing plugging in reservoirs where such polymers are used for secondary oil recovery processes. A typical example of the polyvinyl alcohol tendency to gel is given in the following table:

*Polyvinyl Alcohol Gels at 25° C.*

| Compound | Percent Viscosity Retention/Days Aged at 25° C. |
|---|---|
| 1% Ethoxylated Polyvinyl Alcohol | 99/131 |
| 1% Polyvinyl Alcohol | 99/39 |
|  | 128/70 |

From this data, it is apparent that polyvinyl alcohol tends to gel at room temperatures. It is also obvious that ethoxylation has prevented this gelling tendency practically completely.

With regard to the aging characteristics of polyvinyl alcohol, this compound has a pronounced tendency to precipitate from aqueous solutions at elevated temperatures. Ethoxylation of the polyvinyl alcohol results in a product which produces clear solutions even after extended aging periods at elevated temperatures. The data in the following table show specifically that ethoxylated polyvinyl alcohol does not come out of solution at 100° C., whereas, polyvinyl alcohol produces a heavy gel precipitate and thus effectively is degraded to a low viscosity retention. This gel precipitate will further cause plugging of oil reservoirs, whenever unmodified polyvinyl alcohol is used for secondary recovery purposes by viscous aqueous flooding. Although the ethoxylated polyvinyl alcohol does degrade, it is to be noted that the degradation is not as severe a cause of viscosity loss as is the gel preciiptate formation.

*Ethoxylation Prevents Polyvinyl Alcohol Precipitation at 100° C. Aging*

| Compound | Percent Viscosity Retained Divided by Hours | Remarks |
|---|---|---|
| 1% Ethoxylated Polyvinyl Alcohol | 48.5/24 | Clear solution. |
|  | 35.5/840 | Do. |
| 1% Polyvinyl Alcohol | 20.9/23 | Heavy gel precipitate. |

The amount of ethylene oxide in the polymer may vary from about 5 to 300% by weight of the original polyvinyl alcohol. In general, it is preferred to have the polymer contain from 5 to 100 weight percent of the ethylene oxide as compared to the amount of polyvinyl alcohol present. Wherein ethylene oxide adducts of pentaerythritol are used, the molecules are substantially all composed of ethylene oxide.

The molecular weights of the polymers of the present invention should be in excess of about 100,000. In general, preferred polymers should be above about 500,000, preferably, above 1,000,000. The molecular weights may be as high as 3,000,000 to 5,000,000, or up to 10,000,000 and higher. When a polymer has a molecular weight in the range from 500,000 to 1,000,000, it should be used in the concentration of less than about 1% by weight, preferably, in the range from 0.1 to 0.5% by weight. A desirable concentration is 0.3% by weight. The amount of polymer used generally is that amount which will give a viscosity in centipoises of from about 10 to 50 at 25° C. using a Brookfield viscosimeter at 0.3 r.p.m.

As pointed out heretofore, a special adaptation of the invention is to use the thickening agents in conjunction with added formaldehyde. The amount of aldehyde used ranges from about 1 to 10% by weight based upon the amount of thickening agent used.

In accordance with the present invention, the reaction of pentaerythritol or other polyols with ethylene oxide gives products having polyether chains extending in different directions and is of value since such products, due to their steric configuration, occupy a greater volume in solution and give viscosities of the same order of magnitude as linear polymers without the disadvantages inherent to the purely linear structures. Such branched structures have a smaller viscosity coefficient for loss of viscosity due to degradation of the chains than have linear polymers even though, for the same molecular weight, they have equal or better initial viscosities. By the use of branched structures, degradation viscosity losses are minimized.

The ethylene oxide adducts of polyvinyl alcohol are desirable in that the homogeneity of groups on the polymer chain of polyvinyl alcohol is broken by reacting with ethylene oxide to form branched ether linkages. This reduces the tendency of aqueous solutions of polymer to plug the sandstone.

What is claimed is:

1. In a method of recovering oil from oil bearing formations, the step of flooding the oil bearing formation with water containing as a viscosity improving agent from about 0.1 to 1 percent by weight of a branched chain polymeric ether obtained by reacting ethylene oxide with a polyhydric alcohol, said polymeric ether having a molecular weight in the range from about 100,000 to 3,000,000.

2. A process as defined by claim 1 wherein said polyhydric alcohol is pentaerythritol.

3. A process as defined by claim 1 wherein said polyhydric alcohol is polyvinyl alcohol, and wherein said polymeric ether is produced by reacting 5 to 300 percent by weight of ethylene oxide with said polyvinyl alcohol.

4. A process as defined by claim 1 wherein said polymeric ether is utilized in conjunction with from about 1 to 10 percent by weight of formaldehyde based upon the amount of polymeric ether present.

References Cited in the file of this patent

UNITED STATES PATENTS

| | | |
|---|---|---|
| 1,971,662 | Schmidt et al. | Aug. 28, 1934 |
| 2,341,500 | Detling | Feb. 8, 1944 |
| 2,587,501 | Meadors | Feb. 26, 1952 |
| 2,731,414 | Binder et al. | Jan. 17, 1956 |
| 2,796,413 | Baer | June 18, 1957 |
| 2,827,964 | Sandiford et al. | Mar. 25, 1958 |
| 2,842,492 | Engelhardt et al. | July 8, 1958 |